(12) United States Patent
Nielson et al.

(10) Patent No.: US 11,279,166 B1
(45) Date of Patent: Mar. 22, 2022

(54) COMPACT WRITING INSTRUMENT

(71) Applicants: Thomas Nielson, Lamoille, NV (US); Jens G. Jacobson, Lincoln, NE (US)

(72) Inventors: Thomas Nielson, Lamoille, NV (US); Jens G. Jacobson, Lincoln, NE (US)

( * ) Notice: Subject to any disclaimer, the term of this patent is extended or adjusted under 35 U.S.C. 154(b) by 0 days.

(21) Appl. No.: 17/161,644

(22) Filed: Jan. 28, 2021

Related U.S. Application Data

(63) Continuation-in-part of application No. 16/867,551, filed on May 5, 2020, which is a continuation of application No. 15/976,810, filed on May 10, 2018, now Pat. No. 10,639,926.

(60) Provisional application No. 62/967,022, filed on Jan. 28, 2020, provisional application No. 62/504,510, filed on May 10, 2017.

(51) Int. Cl.
| | |
|---|---|
| *B43K 25/02* | (2006.01) |
| *B43K 7/00* | (2006.01) |
| *B43K 5/00* | (2006.01) |
| *B43K 24/04* | (2006.01) |
| *B43K 23/08* | (2006.01) |
| *B43K 23/12* | (2006.01) |

(52) U.S. Cl.
CPC ........... *B43K 23/126* (2013.01); *B43K 5/005* (2013.01); *B43K 7/005* (2013.01); *B43K 25/022* (2013.01); *B43K 23/08* (2013.01); *B43K 24/04* (2013.01)

(58) Field of Classification Search
CPC ........ B43K 24/06; B43K 25/022; B43K 5/16; B43K 7/005; B43K 7/12; B43K 5/005; B43K 23/08; B43K 23/10; B43K 23/12; B43K 25/02; B43K 25/028; B43K 24/04; B43K 23/126

USPC .......................................... 401/116, 117, 131
See application file for complete search history.

(56) References Cited

U.S. PATENT DOCUMENTS

| | | |
|---|---|---|
| 1,850,086 A | 3/1932 | Segal |
| 4,601,599 A | 7/1986 | Katoh |
| 5,174,672 A | 12/1992 | Towsend |
| 5,221,152 A | 6/1993 | Chuang |
| 5,993,098 A | 11/1999 | Osada |
| 6,264,389 B1 | 7/2001 | Ducharme |
| 6,276,855 B1 * | 8/2001 | Hsien ..................... B43K 23/12 401/109 |
| 6,474,889 B2 | 11/2002 | Kato |
| 6,616,365 B1 | 9/2003 | Vann |
| 10,639,926 B2 | 5/2020 | Nielson |

(Continued)

*Primary Examiner* — David J Walczak
(74) *Attorney, Agent, or Firm* — Dentons Durham Jones Pinegar

(57) ABSTRACT

A compact writing instrument includes a barrel and a cap. A majority of a length of the barrel and a writing element carried thereby may be received by the cap when the barrel and the cap are placed in a stored providing a compact stored arrangement. The cap may be secured to the barrel in a writing arrangement that extends a length of the writing instrument significantly; for example, to a conventional writing instrument length. Engagement features of the cap and barrel may include steep threads that enable the cap to be assembled with and disassembled from the barrel with one rotation (360°) or less. A clip on the cap may include a closed end that defines a receptacle, with the closed end and receptacle extending beyond a corresponding end of the cap. In addition, the closed end and receptacle may extend partially over the corresponding end of the cap.

16 Claims, 3 Drawing Sheets

(56) References Cited

U.S. PATENT DOCUMENTS

| | | | |
|---|---|---|---|
| 2004/0013460 A1* | 1/2004 | Eddington | B43K 25/02 401/131 |
| 2015/0091251 A1* | 4/2015 | Polk | B43K 29/002 273/138.1 |
| 2016/0075169 A1* | 3/2016 | O'Connor | B43K 23/12 401/195 |

\* cited by examiner

COMPACT WRITING INSTRUMENT

CROSS-REFERENCE TO RELATED APPLICATIONS

This application claims the benefit of priority to the Jan. 28, 2020 filing date of U.S. Provisional Patent Application No. 62/967,022, titled COMPACT WRITING INSTRUMENT, pursuant to 35 U.S.C. § 119(e) ("the '022 Provisional Application"). This application is also a continuation-in-part of U.S. patent application Ser. No. 16/867,551, filed on May 5, 2020 and titled COMPACT WRITING INSTRUMENT ("the '551 Application"), which is a continuation of U.S. patent application Ser. No. 15/976,810, filed on May 10, 2018 and titled COMPACT WRITING INSTRUMENT, which issued as U.S. Pat. No. 10,639,926 on May 5, 2020 ("the '810 Application"), which claims the benefit of priority to the May 10, 2017 filing date of U.S. Provisional Patent Application No. 62/504,510, titled POCKET-KEYRING PEN, pursuant to 35 U.S.C. § 119(e) ("the 510 Provisional Application"). The entire disclosures of the '022 Provisional Application, the '551 Application, the '810 Application, and the '510 Provisional Application are hereby incorporated herein.

TECHNICAL FIELD

This disclosure relates generally to writing instruments, including compact writing instruments. More specifically, this disclosure relates to writing instruments with a barrel and a cap that may be secured together. Even more specifically, a clip may extend beyond an end of the cap; the clip may have a configuration that enables it to secure the pen to thick objects, including keyrings, pants pockets, and the like.

SUMMARY

In various embodiments, a writing instrument according to this disclosure includes a barrel and a cap. The barrel includes a writing element that may be used in a manner known in the art, as well as a body that carries the writing element. The body of the barrel includes a first portion, from which the writing element protrudes. The first portion may also be referred to herein as an "insertion portion" of the body of the barrel. The writing element and/or the insertion portion may have a configuration that enables the writing element to be extended outwardly from and retracted toward the insertion portion of the body. An exterior surface of the insertion portion of the body of the barrel may include one or more cap engagement features.

A second portion of the body of the barrel, which is located opposite from the insertion portion of the body of the barrel, may also be referred to as an "external portion" of the barrel. An exterior surface of the external portion may also include one or more cap engagement features. In some embodiments, the cap engagement feature(s) of the exterior surface of the external portion of the body of the barrel may comprise threads, which may enable the external portion to snap into or otherwise engage the cap in a manner that elongates the writing instrument.

The cap of the writing instrument includes a body and a clip. The body of the cap includes an open first end, which is continuous with an interior of the body. The open first end of the body of the cap and the body of the cap can receive the writing element and the insertion portion of the body of the barrel, from which the writing element protrudes. The interior of the body of the cap, at a location at or adjacent to the first end of the body of the cap, may include one or more barrel engagement features. The barrel engagement feature(s) may be configured complementarily to the corresponding cap engagement feature(s) of or on the exterior surface of the external portion of the body of the barrel to enable the cap to engage the barrel when the cap is assembled with the barrel.

A second end of the body of the cap may be closed. A closed end of the clip may be secured to the cap at or near the second end of the cap. The clip extends along at least a portion of a length of the body of the cap. A gap between the clip and the body of the cap can receive an element (e.g., a shirt pocket, a pants pocket, a retainer on a clipboard or folio, a legal pad, etc.). The clip may also include a receptacle at or near the second end of the cap that enables the clip to receive a key ring, a chain, or any other device that could be used to carry the cap and the writing instrument of which the cap is a part.

In use, the cap may be disengaged from the barrel. The barrel may then be pulled from the cap, removing a writing element of the barrel of the writing instrument from an interior of the cap. In some embodiments, including those where the writing instrument is a compact writing instrument, the writing element may also be extended from a body of the barrel (e.g., telescopically, rotationally, etc.) to extend the length of the barrel, potentially making it easier to use. Once the writing element has been removed from the cap and optionally extended from the body of the barrel of the writing instrument, it may be used in a manner known in the art (e.g., for writing, drawing, etc.). Alternatively, an end of the exterior portion of the body of the barrel may be inserted into the opening of the cap and engage the cap, further extending a length of the writing instrument. Once use of the writing instrument is complete, the cap and the exterior portion of the body of the barrel may be disassembled, a previously extended writing element, if any, may be retracted, and the writing element and the insertion portion of the body of the barrel from which the writing element protrudes may be introduced into the interior of the cap. The cap may then engage the barrel, securing the cap in place on the barrel. The writing instrument may then be stored, for example, by introducing the clip over another object, such as a pocket, a key ring, a keychain, or the like.

Other aspects of the disclosed subject matter, as well as features and advantages of various aspects of the disclosed subject matter, will become apparent to those of ordinary skill in the art through consideration of the ensuing disclosure, the accompanying drawings, and the appended claims.

DETAILED DESCRIPTION

Figure 1:
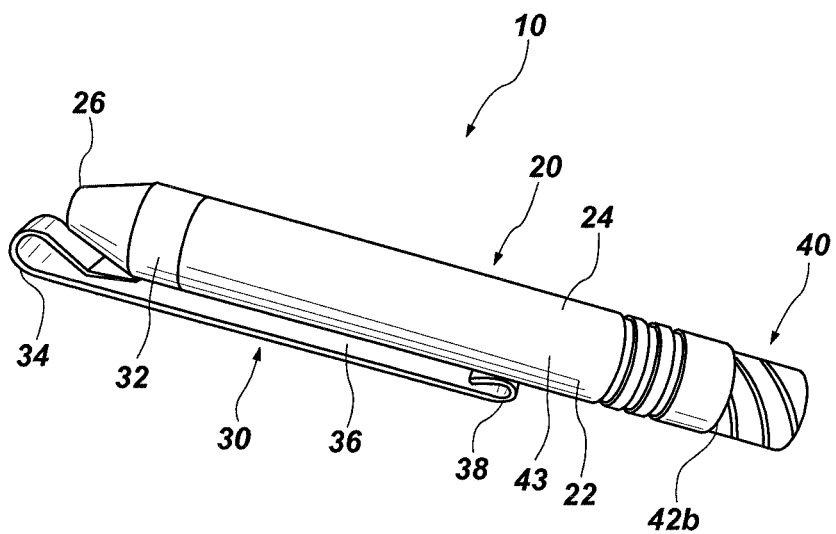
FIG. 1 is a perspective view of an embodiment of a compact writing instrument with a cap and a barrel of the compact writing instrument in a stored arrangement, with the cap over a writing element carried by the barrel.

Referring to FIGS. 1-8 generally, various arrangements of an embodiment of a writing instrument 10 are shown. The writing instrument 10 includes a cap 20 and a barrel 40. The cap 20 includes a clip 30. The barrel 40 includes a writing element 50.

The cap 20 of the writing instrument 10 comprises a body 22 with an elongated, somewhat cylindrical shape. A first end 24 of the body 22 is open, while a second end 26 of the body 20 may be at least partially closed. The first end 24 of the body 22 opens to and is continuous with an interior of the body 22. The open first end 24 and the interior of the body 22 have configurations that enable them to receive portions of the barrel 40, as described in further detail hereinafter.

Figure 4:
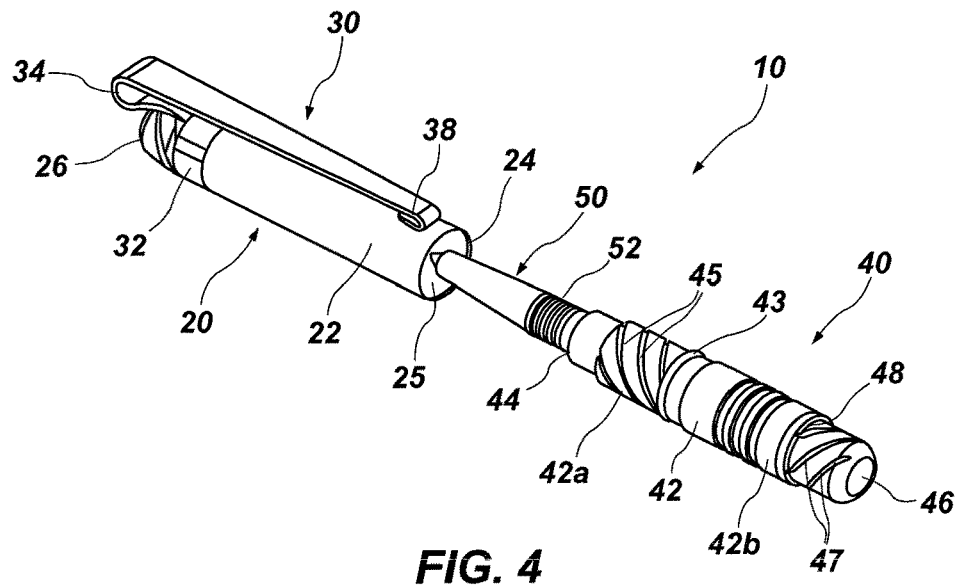
FIG. 4 is a perspective view of the embodiment of compact writing instrument shown in FIG. 1 with the cap and barrel in a less assembled/further disassembled relationship and with the cap over the writing element carried by the barrel.

As shown in FIG. 4, an interior surface of the body 22 may carry one or more barrel engagement features 25. The barrel engagement feature(s) 25 may be located at or adjacent to the first end 24 of the body 22 of the cap 20. The barrel engagement feature(s) 25 may be configured complementarily to corresponding cap engagement feature(s) 45 and 47 on an exterior surface of the body 42 of the barrel 40 to enable the cap 20 to engage the barrel 40 when the cap 20 is assembled with the barrel 40. The barrel engagement features 25 may include, without limitation, recesses, protrusions, threads, interference fitting surfaces, or the like. In a specific embodiment, the barrel engagement features 25 may comprise a circumferentially arranged series of helical threads. The threads may comprise special steep threads that may be oriented about 45° or less relative to an axis through the center of the length of the cap 20. Such threads may extend around an inner circumference of the body 22 of the cap 20 a maximum of one turn (e.g., about one turn, about half a turn, etc.). Such an arrangement of threads may enable the cap 20 to engage a complementary barrel 40 in a partial turn (e.g., half a turn, a quarter of a turn, etc.), enabling the cap 20 to be secured to and removed from the barrel 40 more quickly and easily than with conventional threads.

With continued reference to FIGS. 1-8, the clip 30 may be secured to the body 22 of the cap 20 at or near the second end 26 of the body 22. The clip 30 may include a coupler 32, an upper, closed end 34 that defines a receptacle of the clip 30, an elongated element 36, and a free end 38 on an opposite end of the elongated element 36 from the closed end 34.

The coupler 32 secures the clip 30 to the cap 20 of the writing instrument 10. In the embodiment depicted by FIGS. 1-8, the coupler 32 comprises a ring that extends at least partially around the circumference of the body 22 of the cap 20, near the second end 26 of the body 22. The closed end 34 extends from the coupler 32, away from the body 22 of the cap 20.

When the clip 30 is assembled with the body 22 of the cap 20, the closed end 34 of the clip 30 may be positioned adjacent to the second end 26 of the body 22. The closed end 34 may define a receptacle. The receptacle of the closed end 34 may have a shape and dimensions (e.g., a rounded shape, a teardrop shape, etc.) that enables the clip 30 to receive a ring (e.g., a keyring, etc.), a chain (e.g., a keychain, a necklace, etc.), or any other device that could be used to carry the cap 20 and the writing instrument 10 of which the cap 20 is a part. In some embodiments, the receptacle may engage a thick object, such as a key ring, a keychain, a pants pocket, or the like.

The closed end 34 of the clip 30 and the receptacle defined by the closed end 34 may extend beyond the second end 26 of the body 22. Substantially all (e.g., an enlarged portion of the receptacle, a portion of the receptacle that receives another element, etc.) or all of the receptacle of the closed end 34 may be located beyond the second end 26 of the body 22. In some embodiments, the closed end 34 and its receptacle may extend over at least a portion of the second end 26 of the body 22 without protruding beyond an outer surface of the elongate element 36 of the clip 30. Such arrangements may enable the clip 30, the cap 20, and the writing instrument 10 to hang freely from a ring, a chain, or the like. In a specific embodiment, the closed end 34 of the clip 30 may extend about 0.15 inch (e.g., 0.18 inch, etc.) or more beyond the second end 26 of the body 22. The receptacle of the closed end 34 may measure at least 0.10 inch across and at least 0.10 inch in length with at least 0.10 inch of its length being located beyond the second end 26 of the body 22 of the cap 20. The closed end 34 of the clip 30 may also extend at least partially over the second end 26 of the body 22.

The elongated element 36 of the clip 30 may extend from the closed end 34 of the clip 30. When the clip 30 is attached to the body 22 of the cap 20, the elongated element 36 may extend along at least a portion of a length of the body 22. A gap between the elongated element 36 and an outer surface of the body 22 may be sufficient to receive an element to which the cap 20 and/or the writing instrument 10 is to be secured (e.g., a shirt pocket, a pants pocket (e.g., a pocket of denim jeans, etc.), a retainer on a clipboard or folio, a legal pad, etc.).

The free end 38 of the clip 30 may, when the clip 30 is attached to the body 22 of the cap 20, protrude toward the body 22. Thus, the free end 38 of the clip 30 may, due to the orientation and spring properties of the elongated element 36, engage an element introduced between the clip 30 and the body 22 of the cap 20.

The clip 30 may be formed from any suitable material. As an example, the clip 30 may be formed from stainless steel, steel, brass, aluminum, or the like. In some embodiments, a thickness of the features of the clip 30 may be about double the thickness of the features of a conventional metal clip for a writing instrument. For example, the various features of the clip 30 may have thicknesses of about 0.5 mm or more (e.g., 0.5 mm, 0.6 mm, 0.7 mm, 0.8 mm, 0.9 mm, 1.0 mm, etc.). The material and thickness of the clip 30 may provide it with sufficient strength and resilience to prevent it from breaking under stresses that would break a conventional metal clip for a writing instrument.

The barrel 40 of the writing instrument 10 includes a body 42 with an elongated, somewhat cylindrical shape. The body 42 has a first end 44 and a second end 46. A boundary 43 about midway between the first end 44 and the second end 46 may separate a first portion 42a of the body 42 from a second portion 42b of the body 42, with the first end 44 comprising an end of the first portion 42a and the second end 46 comprising an end of the second portion 42b. In the stored arrangement of the cap 20 and barrel 40 depicted by FIGS. 1 and 2, the first portion 42a (not seen in FIGS. 1 and 2) of the body 42 of the barrel 40 has been introduced into the interior of the body 22 of the cap 20; thus, the first portion 42a of the body 42 of the barrel 40 may also be referred to as an "insertion portion" of the body 42. In the stored arrangement, the second portion 42b of the body 42 of the barrel 40 extends somewhat beyond the first end 24 of the body 22 of the cap 20 and, thus, remains outside of the cap 20; thus, the second portion 42b of the body 42 of the barrel 40 may be referred to as an "external portion" of the body 42.

Figure 2:
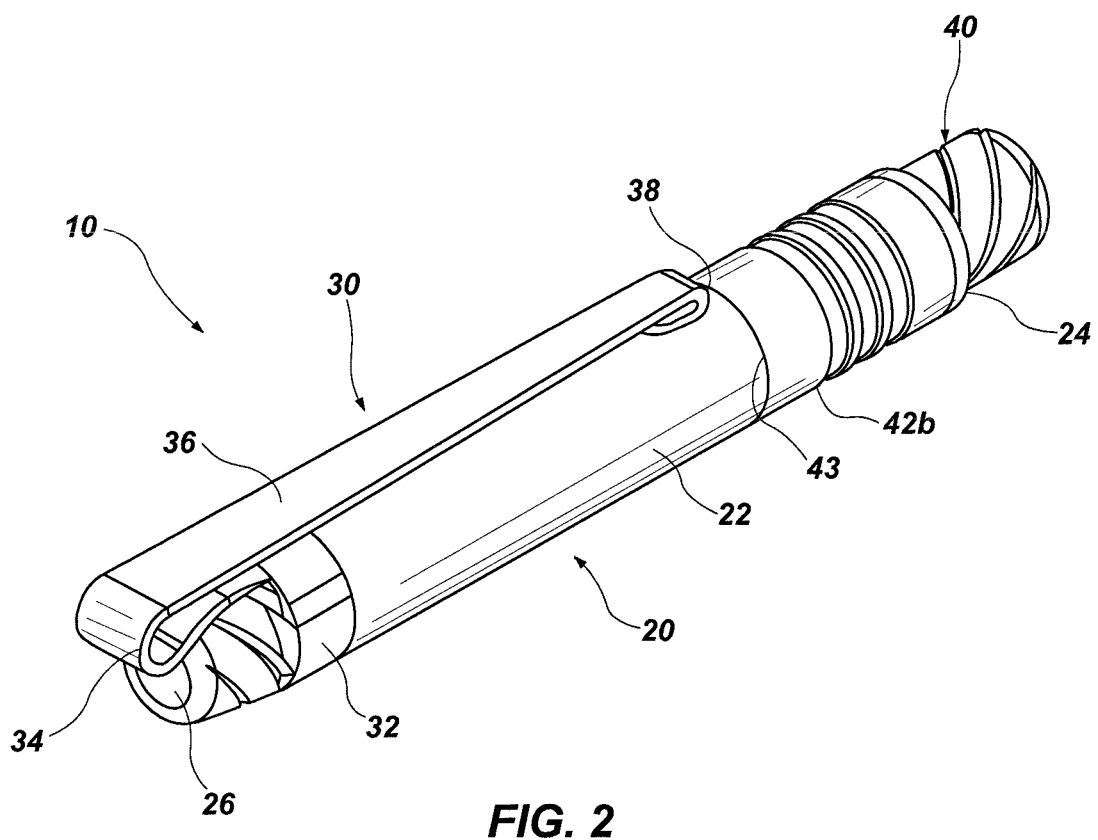
FIG. 2 is another perspective view of the embodiment of compact writing instrument shown in FIG. 1 with the cap and barrel in the stored arrangement and showing features of an embodiment of a clip of the compact writing instrument.
Figure 7:
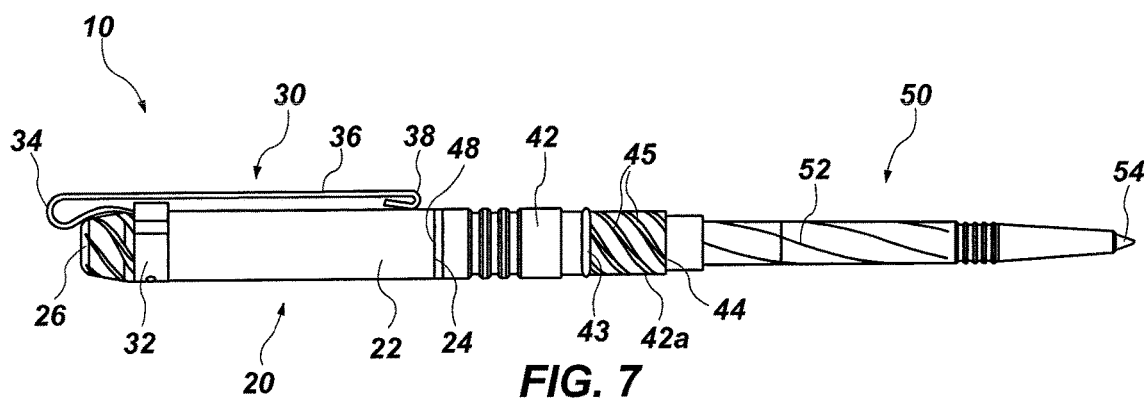
FIG. 7 is a side view of the embodiment of compact writing instrument shown in FIG. 1 with the cap assembled with the end of the exterior portion of the body of the barrel in an writing arrangement.
Figure 8:
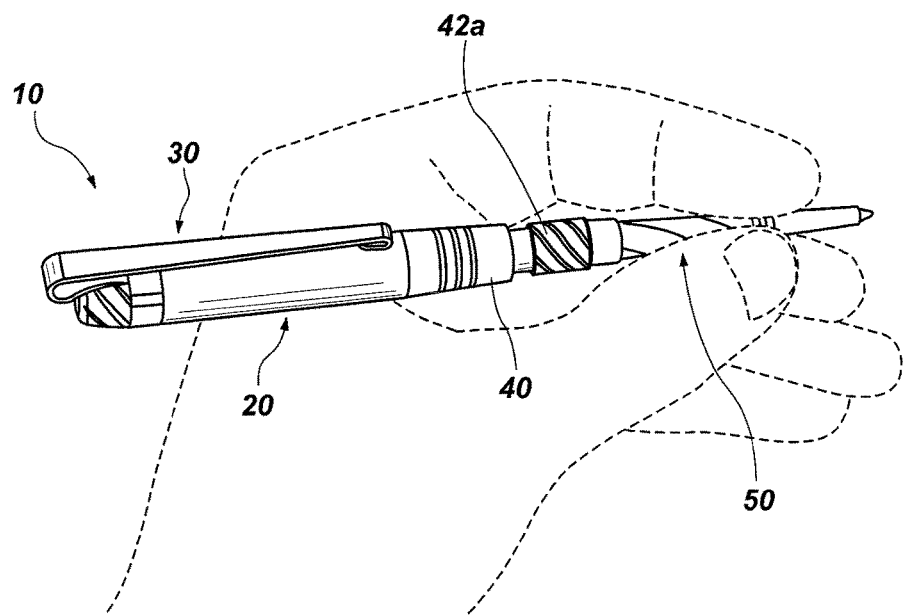
FIG. 8 is a perspective view of the embodiment of compact writing instrument shown in FIG. 1 depicting the cap and barrel in the writing arrangement.

The body 42 of the barrel 40 may include engagement features 45 and 47 that may secure the cap 20 and the barrel 40 of the writing instrument 10 in the stored arrangement seen in FIGS. 1 and 2 and in the writing arrangement seen in FIGS. 7 and 8. More specifically, one or more cap engagement features 45 that cooperate with (e.g., mutually engage, etc.) the barrel engagement feature(s) 25 within the interior of the body 22 of the cap 20 may be carried by the first portion 42a of the body 42 of the barrel 40 to enable the cap 20 to be secured over the first portion 42a of the body 42 of the barrel 40 in the stored arrangement. One or more cap engagement features 47 that cooperate with (e.g., mutually engage, etc.) the barrel engagement feature(s) 25 within the interior of the body 22 of the cap 20 may be carried by the second portion 42b of the body 42 of the barrel 40 to enable the cap 20 to be secured to the second portion 42a of the body 42 of the barrel 40 in the writing arrangement. The cap engagement features 45, 47 may include, without limitation, recesses, protrusions, threads, interference fitting surfaces, or the like.

In a specific embodiment, the cap engagement features 45, 47 may comprise a circumferentially arranged series of helical threads. The threads may comprise special steep threads that may be oriented about 45° or less relative to an axis through the center of the length of the barrel 40. Such threads may extend around an outer circumference of the body 42 of the barrel 40 a maximum of one turn (e.g., about one turn, about half a turn, etc.). Such an arrangement of barrel engagement features 25 and cap engagement features 45, 47 may enable the cap 20 to be secured to the barrel 40 by one twist or less (e.g., a single twist, or 360°; a half twist, or 180°; etc.), enabling the cap 20 to be secured to and removed from the barrel 40 more quickly and easily than with conventional threads.

The writing element 50 extends into an interior of the body 42 through the first end 44 of the body 42 (e.g., into an interior of the first portion 42a of the body 42 and, optionally, into an interior of the second portion 42b of the body 42) and, as seen in FIGS. 4-8, protrudes from the first end 44 of the body 42. The writing element 50 may be secured within the body 42 in any suitable manner known in the art. For example, the interior of the body 42 and the writing element 50 may have complementary configurations that enable the writing element 50 to be assembled with and disassembled from the body 42 to enable refilling and/or replacement of the writing element 50. As another example, one or both of the writing element 50 and the interior of the body 42 may have configurations that enable the writing element 50 to be extended from and retracted toward, or collapsed relative to, the body 42 of the barrel 40 (e.g., they may include features that enable the writing element 50 to telescope relative to the body 42; they may include features that enable the writing element 50 to be rotatably extended from and retracted toward the body 42, etc.). When the writing element 50 is in an extended orientation relative to the body 42, the barrel 40 may have a length of about 3½ inches or more (e.g., 3½ inches, 3¾ inches, 3.9 inches, 4 inches, etc.).

The writing element 50 may comprise any suitable writing instrument known in the art (e.g., a pen, a mechanical pencil, etc.) and may be used in a manner known in the art. The writing element 50 itself may comprise a pen (e.g., a ball point pen, a gel pen, a fountain pen, etc.), a mechanical pencil, a stylus (for writing on a display screen (e.g., a touch-sensitive display screen, etc.) or an electronic device, or any other suitable type of writing instrument. In a specific, but nonlimiting embodiment, the writing element 50 may be capable of carrying a pressurized pen refill. The pressurized pen refill may have a length as short as two inches or less.

Figure 3:
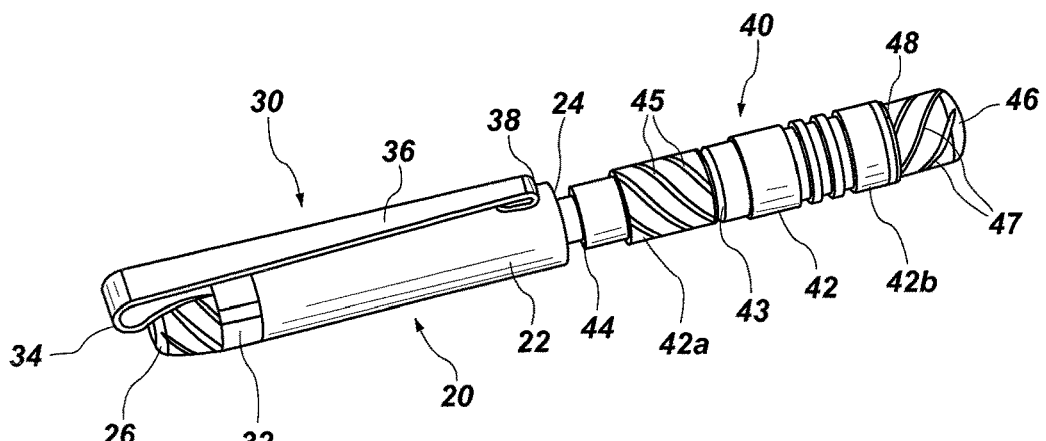
FIG. 3 is a perspective view of the embodiment of compact writing instrument shown in FIG. 1 showing the cap and barrel in a partially assembled/disassembled relationship with the cap over the writing element carried by the barrel.
Figure 5:
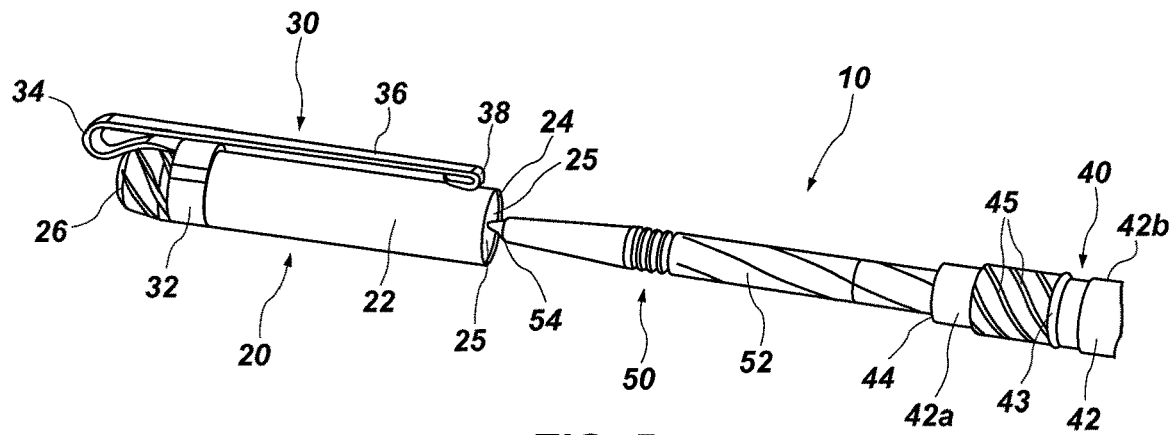
FIG. 5 is a perspective view of the embodiment of compact writing instrument shown in FIG. 1 with the cap and barrel in a disassembled relationship.
Figure 6:
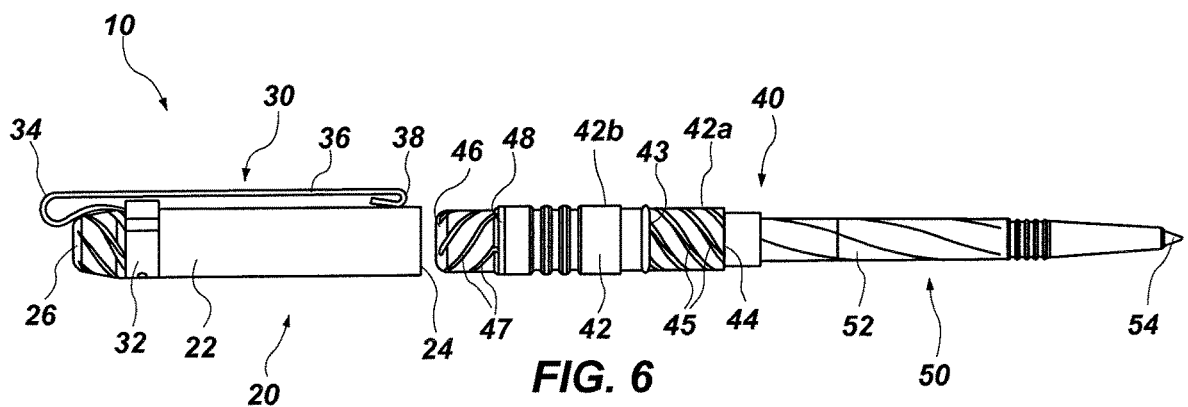
FIG. 6 is a side view of the embodiment of compact writing instrument shown in FIG. 1 showing the cap adjacent to an end of an exterior portion of a body of the barrel in a disassembled relationship.

In a specific embodiment of writing instrument 10 according to this disclosure, when the cap 20 and the barrel 40 are in the stored relationship shown in FIGS. 1 and 2, the total length of the writing instrument 10 may be about 3 inches (e.g., 3.03 inches), with the total length of the assembled cap 20 and barrel 40 being about 2.85 inches and the closed end 34 of the clip 30 extending about 0.15 inch (e.g., 0.18 inch) beyond the second end 26 of the body 22 of the cap 20. When such a writing instrument 10 is disassembled from the stored arrangement, as shown in FIGS. 3-5 and rearranged into the writing arrangement, as shown in FIGS. 6 and 7, its length may be increased to about 4½ inches or more (e.g., 4½ inches, 4¾ inches, 5 inches, 5¼ inches, 5.36 inches, 5½ inches, 5¾ inches, 6 inches, even longer in embodiments where the writing element 50 is extendable from the barrel 40, etc.). Thus, when removed from its stored arrangement and placed in its writing arrangement, a writing instrument 10 according to this disclosure may be transitioned from a compact, readily storable length to a length suitable or even desirable for writing.

Referring still to FIGS. 1-8, a method of using such a writing instrument 10 may include disengaging the cap 20 from the barrel 40. As shown in FIGS. 3-5, the barrel 40 may then be pulled from the cap 20, removing a writing element 50 of the barrel 40 from an interior of the cap 20. In some embodiments, including those where the writing instrument 10 is a compact writing instrument, the writing element 50 may also be extended from a body 42 of the barrel 40 (e.g., telescopically, rotationally, etc.) to extend the length of the barrel 40, potentially making it easier to use. Once the writing element 50 has been removed from the cap 20 and optionally extended from the body 42 of the barrel 40, it may be used in a manner known in the art (e.g., for writing, drawing, etc.). Alternatively, as shown in FIGS. 6 and 7, the second end 46 of the second portion 42b of the body 42 of the barrel 40 may be inserted into the opening of the cap 20 and engage the cap 20, further extending a length of the writing instrument 10 for use in writing, as shown in FIG. 8.

Once use of the writing instrument 10 is complete, the cap 20 and the second portion 42b of the body 42 of the barrel 40 may be disassembled, as shown in FIG. 6, a previously extended writing element 50, if any, may be retracted, and the writing element 50 and the first portion 42a of the body 42 of the barrel 40 from which the writing element 50 protrudes may be introduced into the interior of the cap 20, as shown in FIGS. 3-5. The cap 20 may then engage the barrel 40, securing the cap 20 in place on the barrel 40, as illustrated by FIGS. 1 and 2. The writing instrument 10 may then be stored, for example, by introducing the clip 30 over another object, such as a pocket, a ring, a chain, or the like.

Although the foregoing description sets forth many specifics, these should not be construed as limiting the scope of any of the claims, but merely as providing illustrations of some embodiments and variations of elements or features of the disclosed subject matter. Other embodiments of the disclosed subject matter may be devised which do not depart from the spirit or scope of any of the claims. Features from different embodiments may be employed in combination. Accordingly, the scope of each claim is limited only by its plain language and the legal equivalents thereto.

What is claimed:

1. A writing instrument, including:
    a barrel with:
        a writing element;
        a body including:
            a first portion from which the writing element protrudes, an exterior surface of the first portion including a cap engagement feature; and
            a second portion opposite from the first portion, an exterior surface of the second portion including another cap engagement feature; and
    a cap with:
        a body including a side surface, a first end, an interior, and a second end, the first end opening to the interior, the first end and the interior capable of receiving the writing element and the first portion of the body of the barrel to place the cap and the barrel in an assembled relationship, an interior surface of the body of the cap including a barrel engagement feature that engages the cap engagement feature and the another cap engagement feature of the body of the barrel; and
        a clip including an end secured in place to or over the side surface of the body of the cap, extending over a portion of the side surface of the body of the cap toward and beyond the second end of the body of the cap, bending back over itself to define a closed end, and extending from the closed end toward the first end of the body of the cap to define an elongated element that terminates at a free end, the closed end including a protruding portion defining an enlarged receptacle that is positioned at least partially beyond the second end of the cap.

2. The writing instrument of claim 1, wherein the closed end of the clip extends partially over the second end of the cap.

3. The writing instrument of claim 1, wherein the closed end of the clip does not protrude beyond an outer surface of the elongated element of the clip.

4. The writing instrument of claim 1, wherein substantially all of the enlarged receptacle defined by the closed end of the clip is located beyond the second end of the cap.

5. The writing instrument of claim 1, wherein the writing element is capable of telescoping relative to the body of the barrel.

6. The writing instrument of claim 1, wherein the cap engagement feature, the another cap engagement feature, and the barrel engagement feature comprise complementary threads arranged to enable the cap to be secured to the barrel in the assembled relationship by rotating the cap or the barrel 360° or less.

7. The writing instrument of claim 6, wherein the cap engagement feature comprises a series of helical threads arranged parallel to one another, each helical thread of the series of helical threads of the cap engagement feature of the barrel oriented at most 45° relative to an axis through a center of a length of the barrel or the cap and extending no more than once around a circumference of the exterior surface of the second portion of the body of the barrel.

8. The writing instrument of claim 1, wherein the cap engagement feature, the another cap engagement feature, and the barrel engagement feature comprise complementary threads arranged to enable the cap to be secured to the barrel in the assembled relationship by rotating the cap or the barrel 180° or less.

9. A writing instrument, including:
    a barrel with:
        a writing element; and
        a body carrying the writing element;
    a cap with:
        a body including a side surface, a first end, an interior, and a second end, the first end opening to the interior, the first end and the interior capable of receiving the writing element and the body of the barrel to place the cap and the barrel in a stored arrangement; and
        a clip including an end secured in place over the side surface of the body of the cap, extending over a portion of the side surface of the body of the cap toward and beyond the second end of the body of the cap, bending back over itself to define a closed end, and extending from the closed end toward the first end of the body of the cap to define an elongated element that terminates at a free end, the closed end including a protruding portion defining an enlarged receptacle that is positioned at least partially beyond the second end of the cap.

10. The writing instrument of claim 9, wherein the closed end of the clip extends partially over the second end of the cap.

11. The writing instrument of claim 9, wherein the closed end of the clip does not protrude beyond an outer surface of the elongated element of the clip.

12. The writing instrument of claim 9, wherein substantially all of the enlarged receptacle defined by the closed end of the clip is located beyond the second end of the cap.

13. The writing instrument of claim 9, wherein an entirety of the enlarged receptacle defined by the closed end of the clip is located beyond the second end of the cap.

14. A writing instrument, including:
    a barrel with:
        a writing element;
        a body including:
            a first portion from which the writing element protrudes, an exterior surface of the first portion including a cap engagement feature; and
            a second portion opposite from the first portion, an exterior surface of the second portion including another cap engagement feature; and
    a cap with:
        a body including a first end, an interior, and a second end, the first end opening to the interior, the first end and the interior capable of receiving the writing element and the first portion of the body of the barrel to place the cap and the barrel in an assembled relationship, an interior surface of the body of the cap including a barrel engagement feature that engages the cap engagement feature and the another cap engagement feature of the body of the barrel, the cap engagement feature, the another cap engagement feature, and the barrel engagement feature comprise complementary threads oriented at an angle of about 45° or less to an axis through the center of the length of the barrel or the cap.

15. The writing instrument of claim 14, wherein the cap engagement feature, the another cap engagement feature, and the barrel engagement feature comprise complementary threads arranged to enable the cap to be secured to the barrel in the assembled relationship by rotating the cap or the barrel 180° or less.

16. The writing instrument of claim 14, wherein the cap engagement feature comprises a series of helical threads arranged parallel to one another, each helical thread of the series of helical threads of the cap engagement feature of the barrel oriented at most 45° relative to an axis through a center of a length of the barrel or the cap and extending no more than once around a circumference of the exterior surface of the second portion of the body of the barrel.

* * * * *